Feb. 16, 1932.  F. LA GRANDE  1,845,294
TITLE STAND
Filed Aug. 21, 1929    4 Sheets-Sheet 3
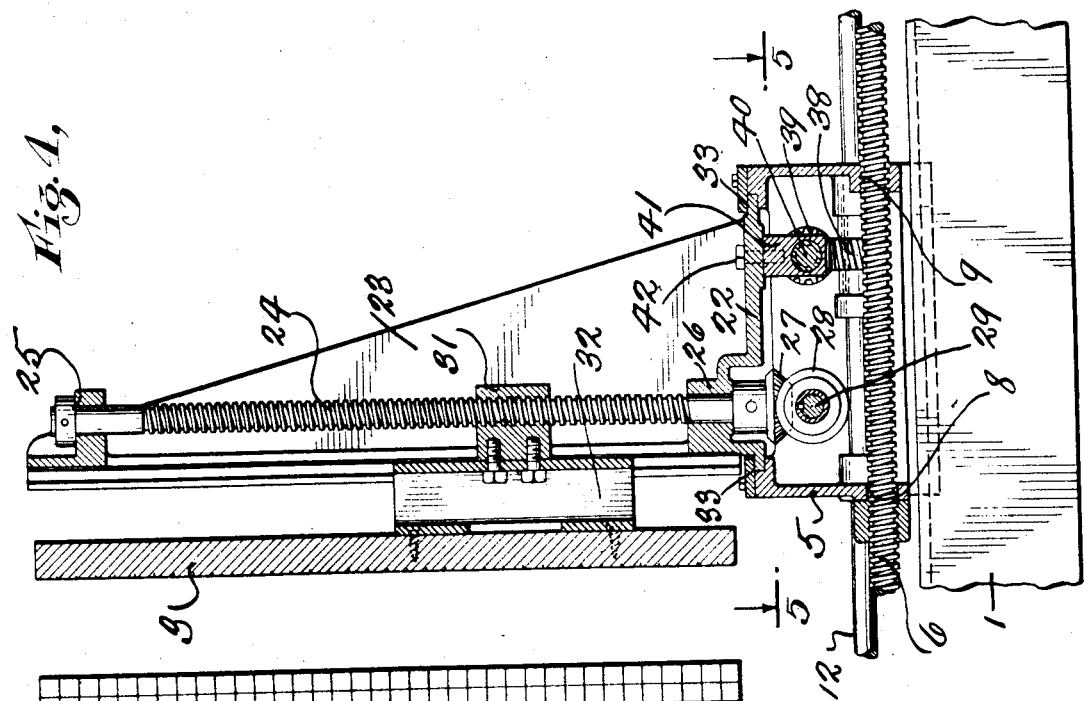
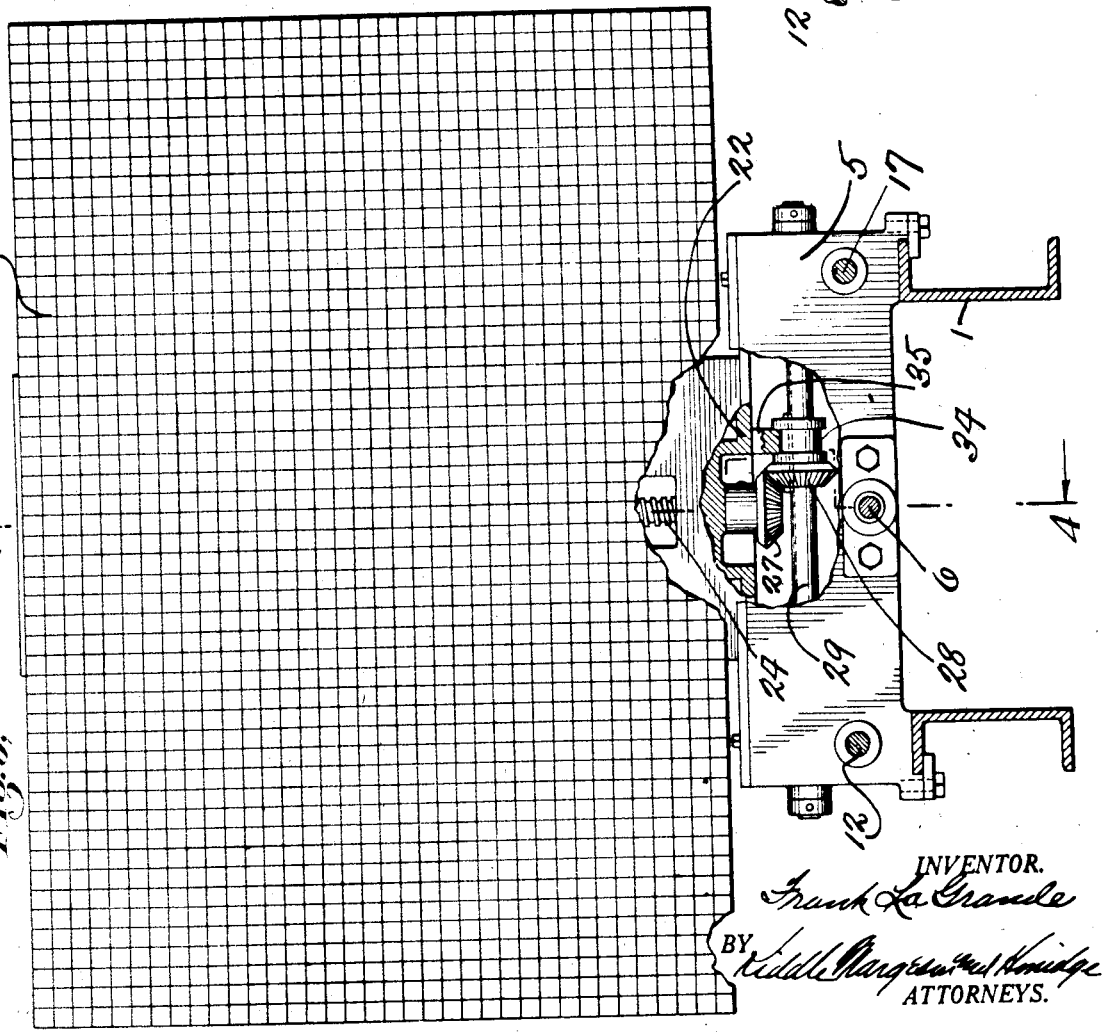
INVENTOR.
Frank La Grande
BY
ATTORNEYS.

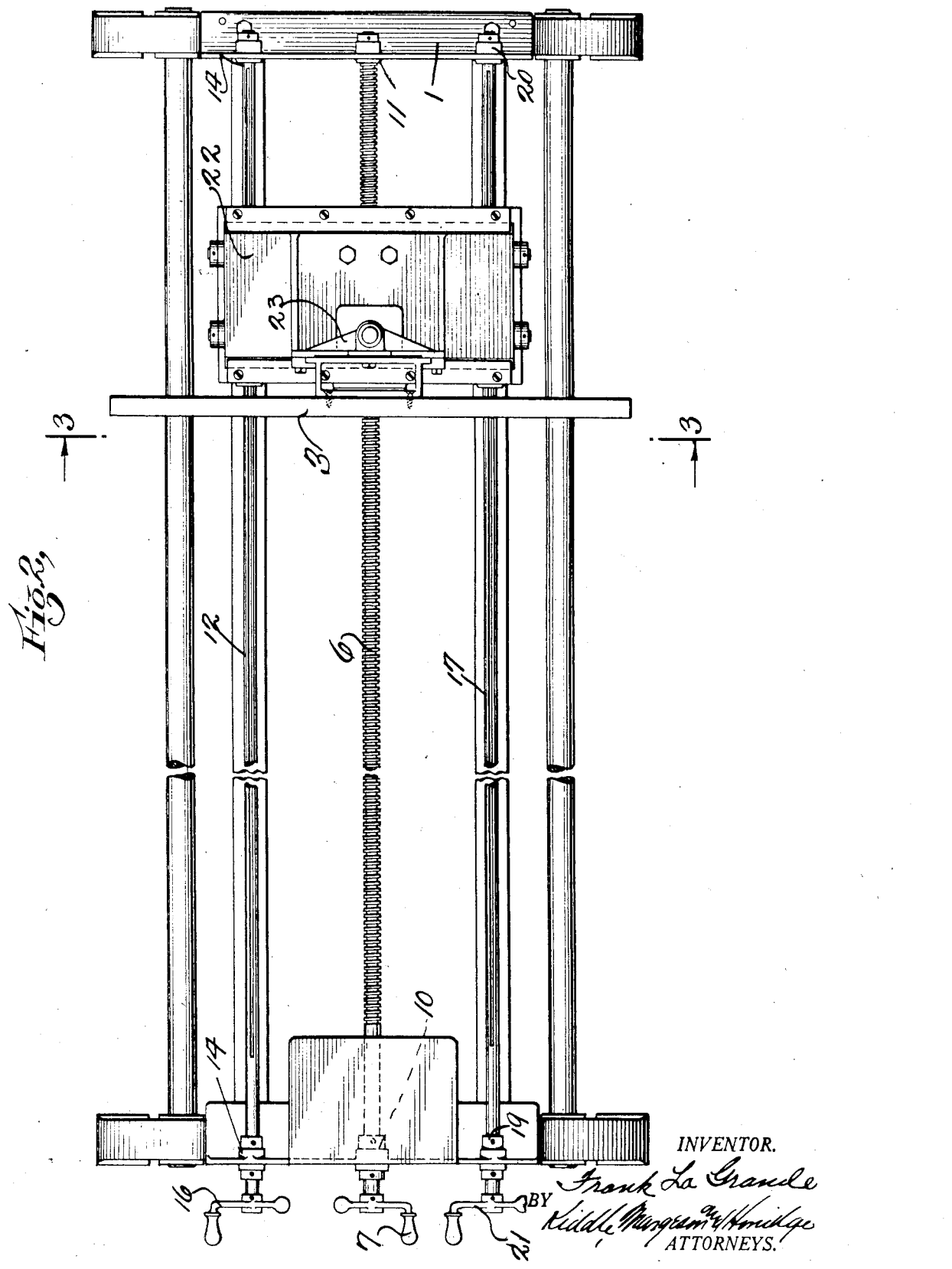

Feb. 16, 1932.     F. LA GRANDE     1,845,294
TITLE STAND
Filed Aug. 21, 1929     4 Sheets-Sheet 4
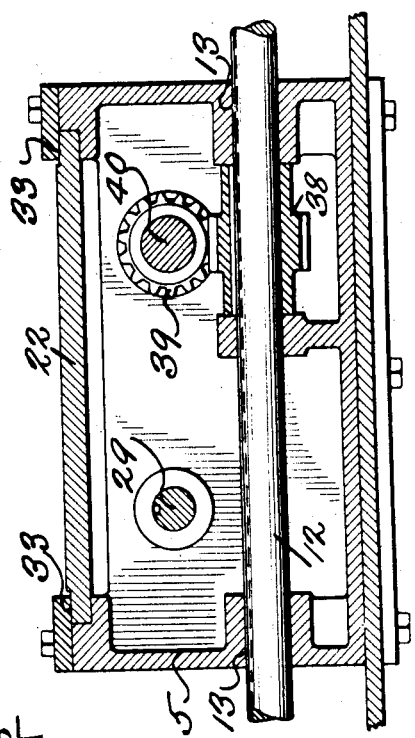
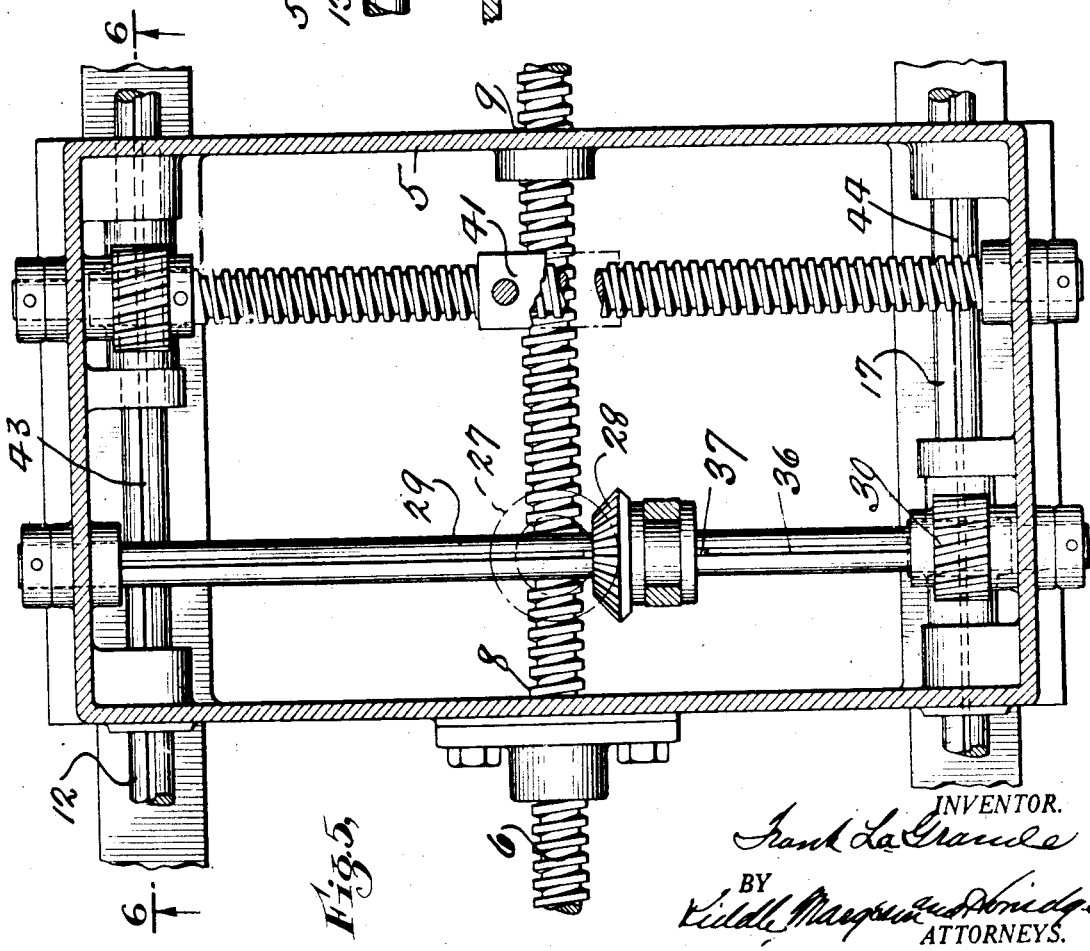
INVENTOR.
Frank LaGrande
BY
Kiddle, Margerum and Bridge
ATTORNEYS.

Patented Feb. 16, 1932

1,845,294

UNITED STATES PATENT OFFICE

FRANK LA GRANDE, OF COYTESVILLE, NEW JERSEY, ASSIGNOR, BY MESNE ASSIGNMENTS, TO PARAMOUNT PUBLIX CORPORATION, OF NEW YORK, N. Y., A CORPORATION OF NEW YORK

TITLE STAND

Application filed August 21, 1929. Serial No. 387,314.

This invention relates to an improvement in title stands for use in connection with the photographing of titles, etc. in motion picture work, and has for one of its objects a stand which is adjustable laterally, and vertically, as well as toward and away from the camera.

A further object of my invention is the provision of a title stand adjustable as above indicated and so constructed and arranged as to give maximum rigidity to the stand at all times.

In the drawings:

Fig. 2 is a plan view of my improved stand;

Fig. 3 is a section on the line 3—3 of Fig. 2;

Fig. 4 is a section on the line 4—4 of Fig. 3;

Fig. 5 is a section on the line 5—5 of Fig. 4; and

Fig. 6 is a section on the line 6—6 of Fig. 5.

Figure 1:
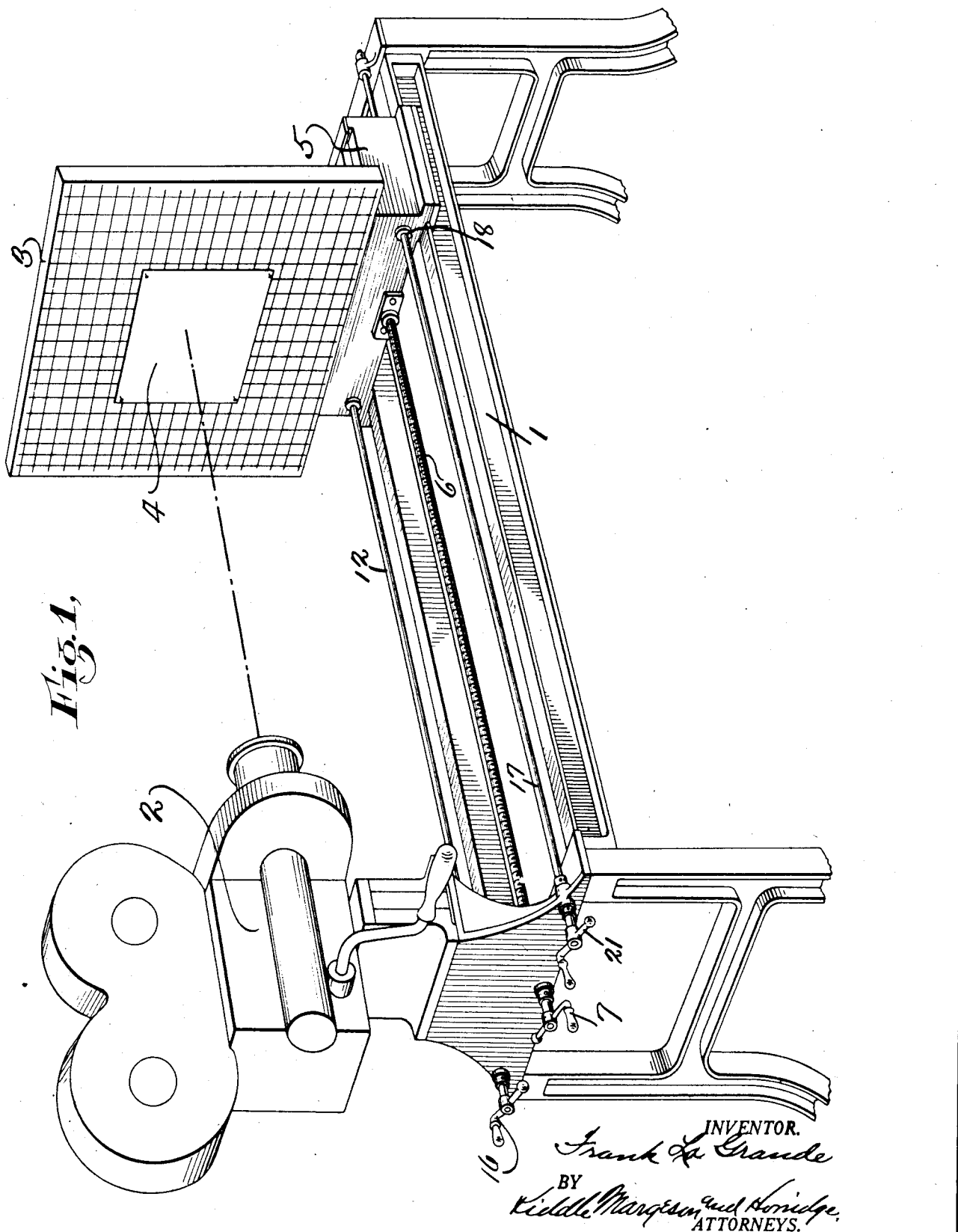
Fig. 1 is a view in perspective showing my improved stand with a camera in position to photograph a title carried by the stand.

Referring to the drawings in detail, my invention comprises a table or bed 1 which is adapted to support a camera 2 mounted thereon adjacent one end of the bed, and to adjustably support a carrier 3 for the title which is to be photographed, the title to be fastened to the carrier 3 in any suitable fashion. A title card is shown at 4.

5 designates a gear box mounted in gib guides in the table 1, and adjustable lengthwise of the table to and from the camera 2 by means of a threaded rod 6 which extends lengthwise of the table and is provided at its outer end with an operating handle 7 whereby the rod may be rotated.

As will be seen from Fig. 4 the rod 6 is threaded through the bottom of the gear box 5, as indicated at 8 and 9, so that rotation of the rod 6 in a clockwise direction will draw the gear box toward the camera and rotation of the rod in the other direction will move the gear box away from the camera.

In order that the adjusting rod 6 may be rigid the same is mounted in bearings at each end of the bed 1 as shown at 10 and 11.

At one side of the rod 6 is an adjusting rod 12 provided as will be hereinafter pointed out for the purpose of moving the carrier 3 laterally in both directions. This rod passes through the gear box as shown at 13 and is mounted in bearings 14 at each end of the bed of the apparatus. The outer end of this adjusting rod is provided with an operating handle 16 for rotating the rod.

At the other side of the screw threaded adjusting rod 6 is a rod 17, provided for the purpose of adjusting the carrier 3 vertically, as will be hereinafter pointed out. This rod passes through the gear box as shown at 18 and is mounted at each end in bearings 19 and 20, provided on the bed 1 so as to give rigidity to the rod. The outer end of the rod 17 is provided with an operating handle 21 whereby the rod may be rotated in both directions.

The cover 22 of the gear box 5 which is adjustable laterally is provided with a vertically extending bracket 23, and extending vertically from the cover is a threaded adjusting rod 24 the outer end of which has bearing in the bracket 23 as shown at 25, while the lower end passes into the gear box through a bearing 26 provided on the gear box cover. The lower end of this threaded adjusting rod 24 carries a bevel gear 27 in mesh with a gear 28 mounted on a shaft 29, the latter extending horizontally lengthwise of the gear box 5 and transversely of the bed of the machine. This shaft has a bearing in the ends of the gear box so as to be rigidly supported.

The shaft 17 carries a spiral gear meshing with a spiral gear 30 on the shaft 29 so that when the shaft 17 is rotated rotary motion will be imparted to the shaft 29 through the two spiral gears just mentioned and from thence motion will be transmitted through gears 27 and 28 to rotate the vertically extending threaded rod 24. The rod 24 carries a nut 31 and secured to this nut is a holder 32 which in turn supports the carrier 3. As a consequence of this construction it will be obvious that rotation of the shaft 24 by the rod 17 will effect a vertical movement either up or down of the nut 31 and a consequent movement of the title carrier 3.

The box cover 22 is slidable laterally in guides 33 transversely of the bed of the machine to carry the member 3 laterally in either direction. The mechanism for effecting this lateral movement will be described presently.

In view of the fact that the carrier 3 is to be given a lateral movement and inasmuch as the threaded shaft 24 is given the same movement some provision must be made for maintaining under these circumstances the gears 27 and 28 in constant mesh. For this reason I provide the hub of the gear 28 with a groove 34 which is engaged by a projection 35 provided on the underside of the cover 22. Consequently, the gear 28 will be caused to move laterally with the cover 22 at all times without, however, interfering with the necessary rotation of gear 28 and gears 27 and 28 will be maintained in contsant mesh. To permit of this lateral movement of the gear 28 on the shaft 29 I provide a keyway in this shaft which is shown at 36 and which is engaged by a key 37 carried by the gear hub.

Lateral movement of the carrier 3 is effected through a spiral gear 38 on the adjusting shaft 12, this gear meshing with a spiral gear 39 which is mounted on a screw threaded shaft 40 extending longitudinally of the gear box and mounted in bearings at each end thereof. This shaft 40 carries a block or nut 41 secured to the gear case cover as shown at 42. Obviously upon rotation of the shaft 12 the nut 41 will be moved laterally, carrying with it the gear case cover 22 and through the construction above described the carrier 3.

In order that the gear housing may move toward and away from the camera 2 upon rotation of the shaft 6 without interfering with any of the gear trains within the gear housing or gear case the rod 12 is keyed as shown at 43 so as to permit the gear 38 carried thereby to move longitudinally of this shaft, the gear 39 meshing with this gear moving of course with the movement of the gear housing owing to the fact that the shaft 40 carrying the gear 39 has its bearing in the gear housing.

The shaft or rod 17 is likewise keyed as shown at 44 so as to permit the spiral gear carried thereby and which meshes with the spiral gear 30 to move along the shaft as the gear housing is adjusted toward and away from the camera, spiral gear 30 traveling with the housing as the same is mounted on the rod 29 having a bearing in the ends of the housing.

It will be understood from the foregoing that my title stand is so constructed and arranged that any one of the three movements above described of the carrier 3 is possible independently of the others or that any two or all three movements may be performed simultaneously.

It will be understood also that the movement or movements above described of the carrier 3 may be effected while cranking the camera 2 which is of advantage in taking certain types of photographs.

It is to be understood that changes may be made in the details of construction above described within the purview of my invention.

It is to be understood, furthermore, that while I have shown the rods 6, 12 and 17 driven by the handles 7, 16 and 21, respectively, that if desired a motor drive may be employed for these rods or adjusting shafts.

What I claim is:—

1. The combination of a title carrier, a gear box, a cover for the gear box, a bracket carried by said cover, a threaded rod mounted in fixed bearings on said carrier, a nut on said rod and rigidly attached to said carrier whereby rotation of the rod will effect vertical adjustment of the carrier; and a remotely operated gear train within the gear box for effecting rotation of said threaded rod.

2. The combination of a title carrier, a gear box, a cover for the gear box, a bracket on said cover, a threaded rod carried in bearings in said bracket, and operatively connected to said carrier, a remotely operated gear train within said gear box for imparting rotary motion to said threaded rod to impart vertical movement to the carrier, a cover for the gear box and a remotely operated gear train within the box for moving said cover and said threaded rod and carrier laterally, said gear trains being operable simultaneously and individually.

3. The combination of a title carrier, a vertically extending threaded rod carrying said carrier for vertical adjustment, a gear box, a gear train within the box remotely actuated for driving said rod, a cover for the gear box, a gear train remotely actuated for moving said cover, rod and carrier laterally independently of and simultaneously with the rotation of said rod, and a threaded rod threaded into said gear box and driven from a point remote from the gear box for moving said gear box bodily toward and away from a cooperating camera.

4. The combination of a gear box, a bed slidably supporting the same, an operating rod threaded into the box for sliding the box longitudinally on the bed, a cover for said box, a threaded rod within the box and operatively connected to said cover to effect a movement of the cover relatively to the box transversely of said bed, an operating rod parallel to the first mentioned threaded rod for operating the threaded rod attached to the box cover from a remote point, a vertically extending rod attached to the gear box cover, a title carrier operatively attached thereto, and an operating rod for operating said vertically extending rod.

This specification signed this 16 day of August, 1929.

FRANK LA GRANDE.